(12) United States Patent
Robbins et al.

(10) Patent No.: US 8,233,204 B1
(45) Date of Patent: Jul. 31, 2012

(54) OPTICAL DISPLAYS

(75) Inventors: Steven J. Robbins, San Jose, CA (US);
James H. Stanley, Palo Alto, CA (US);
Francois Raynal, San Jose, CA (US);
Robert D. Brown, Lake Oswego, RI (US); James M. Tedesco, Livonia, MI (US); Wyatt L. Hendrick, San Diego, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 326 days.

(21) Appl. No.: 12/571,262

(22) Filed: Sep. 30, 2009

(51) Int. Cl.
*G02B 5/32* (2006.01)
*G02B 5/18* (2006.01)
*G09G 5/00* (2006.01)

(52) U.S. Cl. ............... 359/15; 359/566; 359/568; 345/7
(58) Field of Classification Search .................. 359/566, 359/568, 15; 385/31, 37; 345/7
See application file for complete search history.

(56) References Cited

U.S. PATENT DOCUMENTS

| | | |
|---|---|---|
| 4,711,512 A | 12/1987 | Upatnieks |
| 4,928,301 A | 5/1990 | Smoot |
| 5,117,285 A | 5/1992 | Nelson et al. |
| 5,159,445 A | 10/1992 | Gitlin et al. |
| 5,243,413 A | 9/1993 | Gitlin et al. |
| 5,317,405 A | 5/1994 | Kuriki et al. |
| 5,341,230 A | 8/1994 | Smith |
| 5,359,362 A | 10/1994 | Lewis et al. |
| 5,400,069 A | 3/1995 | Braun et al. |
| 5,438,357 A | 8/1995 | McNelley |
| 5,500,671 A | 3/1996 | Andersson et al. |
| 5,515,184 A | 5/1996 | Caulfield et al. |
| 5,532,736 A | 7/1996 | Kuriki et al. |
| 5,572,248 A | 11/1996 | Allen et al. |
| 5,612,733 A | 3/1997 | Flohr |
| 5,612,734 A | 3/1997 | Nelson et al. |
| 5,619,254 A | 4/1997 | McNelley |
| 5,856,842 A | 1/1999 | Tedesco |
| 6,825,987 B2 | 11/2004 | Repetto et al. |
| 7,003,187 B2 * | 2/2006 | Frick et al. ............ 385/16 |
| 7,181,108 B2 | 2/2007 | Levola |
| 7,206,107 B2 | 4/2007 | Levola |

OTHER PUBLICATIONS

Amitai, Y., et al. "Visor-display design based on planar holographic optics," Applied Optics, vol. 34, No. 8, Mar. 10, 1995, pp. 1352-1356.

* cited by examiner

*Primary Examiner* — Jack Dinh
(74) *Attorney, Agent, or Firm* — Donna P. Suchy; Daniel M. Barbieri

(57) ABSTRACT

An apparatus for providing an optical display includes an optical substrate for propagating light received from a light source, a first set of one or more switchable diffractive elements in the substrate, and a second set of one or more switchable diffractive elements in the substrate. Each diffractive element in the second set corresponds to a diffractive element in the first set. Each of the diffractive elements in the first and second sets is configured to switch between on and off states. One of the states is for diffracting light and the other state for allowing light to pass through. Each of the first set of diffractive elements is configured to diffract the light at an angle for propagation in the substrate. Each of the second set of diffractive elements is configured to diffract the light for display.

19 Claims, 8 Drawing Sheets

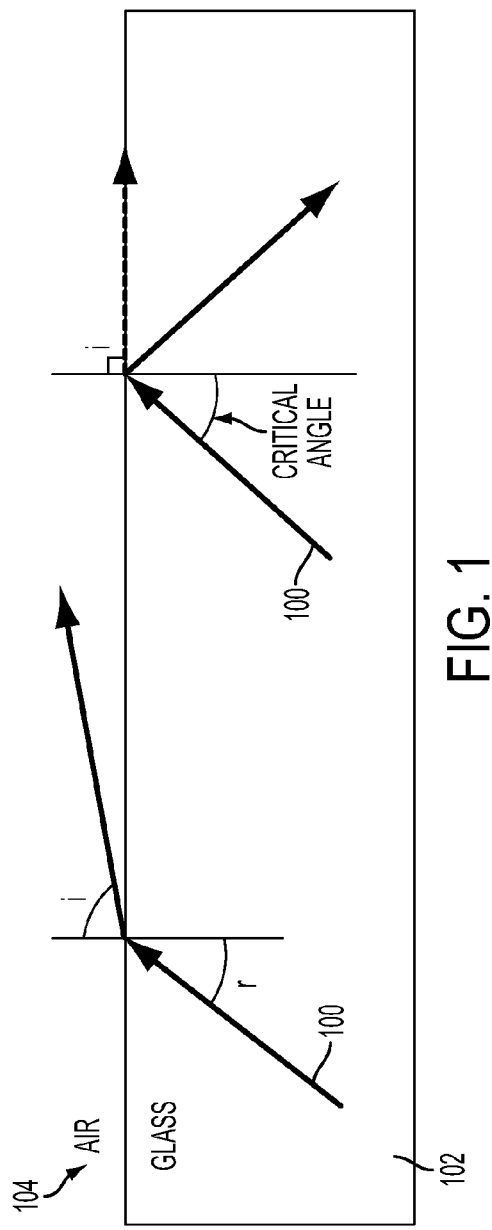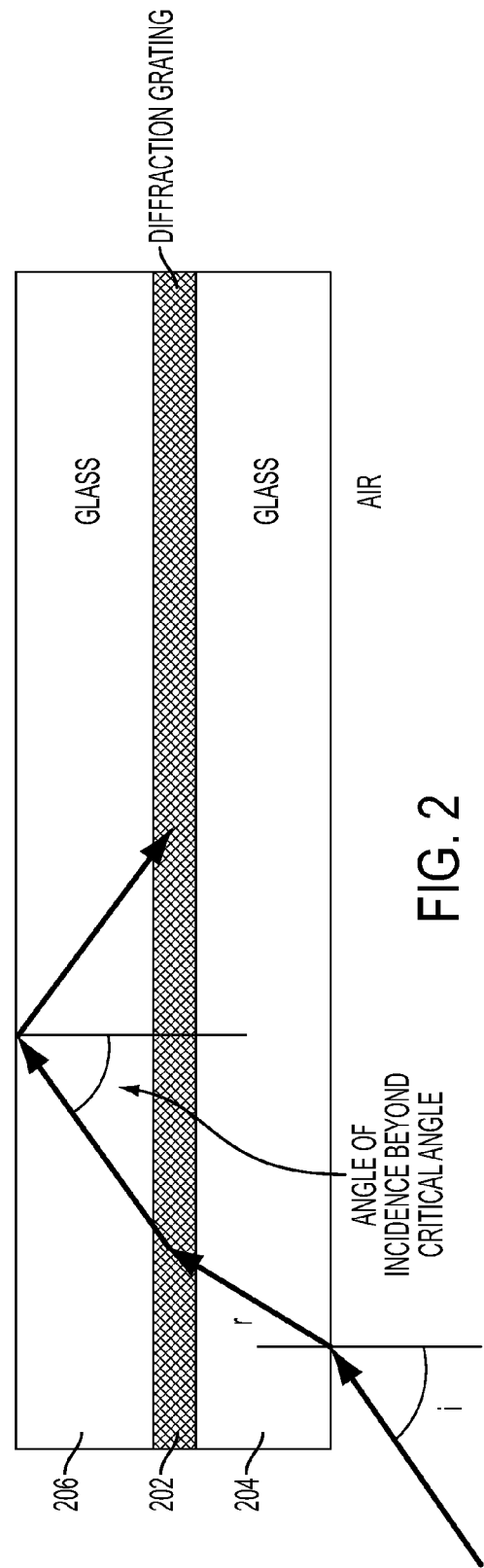

400

| | | PERIOD [LINES/um] | | | | | | |
|---|---|---|---|---|---|---|---|---|
| INCIDENT ANGLES [DEGREES] | | 1.55 | 1.65 | 1.75 | 1.85 | 1.95 | 2.05 | 2.10917 |
| IN AIR | IN GLASS | EXIT ANGLE [DEGREES] | | | | | | |
| -71.57 | -38.66 | | | | | | | |
| -43.15 | -26.77 | 90 | | | | | | |
| -40 | -25.06 | 80.05 | | | | | | |
| -37.23 | -23.48 | 73.713 | 84.93 | | | | | |
| -34.22 | -21.73 | 68.7 | 75.45 | 90 | | | | |
| -30.96 | -19.8 | 64.19 | 69.46 | 76.57 | 90 | | | |
| -27.47 | -17.69 | 59.91 | 64.35 | 69.66 | 76.87 | 90 | | |
| -23.75 | -15.38 | 55.75 | 59.64 | 64.03 | 69.27 | 76.29 | 90.0 | |
| -21.01 | -13.65 | 52.89 | 56.48 | 60.45 | 64.98 | 70.45 | 78.12 | 89.96 |
| -17.08 | -11.15 | 49.01 | 52.28 | 55.81 | 59.71 | 64.11 | 69.37 | 73.20 |
| -12.97 | -8.50 | 45.17 | 48.20 | 51.42 | 54.88 | 58.66 | 62.92 | 65.75 |
| -8.73 | -5.74 | 41.41 | 44.23 | 47.21 | 50.36 | 53.73 | 57.40 | 59.76 |
| -4.39 | -2.89 | 37.72 | 40.39 | 43.18 | 46.09 | 49.17 | 52.46 | 54.52 |
| 0.00 | 0.00 | 34.15 | 36.70 | 39.33 | 42.07 | 44.93 | 47.94 | 49.81 |
| 4.39 | 2.89 | 30.73 | 33.17 | 35.69 | 38.29 | 40.98 | 43.79 | 45.52 |
| 8.73 | 5.74 | 27.48 | 29.84 | 32.27 | 34.76 | 37.32 | 39.98 | 41.60 |
| 12.97 | 8.50 | 24.43 | 26.73 | 29.08 | 31.48 | 33.95 | 36.49 | 38.03 |

LIGHT PROPAGATES INSIDE THE WAVEGUIDE BETWEEN 90 DEGREES
TO THE NORMAL (I.E. PARALLEL TO THE SUBSTRATE SURFACE AND THE
TOTAL INTERNAL REFLECTION (TIR) ANGLE OF THE SUBSTRATE

OPTICAL DISPLAYS

BACKGROUND

The present disclosure relates generally to the field of display optics. More specifically, the disclosure relates to substrate guided optics.

Conventional solutions for wide field of view Head Mounted Displays (HMDs) (e.g., a helmet mounted display) and Head Up Displays (HUDs) generally include off-axis visors, combiners, and multiple complex tilted and decentered lenses. The field of view that can be achieved with conventional fixed diffractive components may be limited to less than about 30 degrees external angle. This limited field of view may not meet requirements for digital night vision systems and wide field of view HUDs or HMDs.

Conventional HMD optical designs, such as those for the Joint Helmet Mounted Cueing System (JHMCS), the Joint Strike Fighter (JSF), and the Eurofighter Typhoon, use complex tilted and decentered, aspheric plastic lenses. For example, the JSF HMD incorporates seven lenses in order to correct the off-axis aberrations induced by the visor. These lens elements are expensive, tolerance limited, and require precision tooling to assemble.

The optical performance of conventional visor-projected designs, typically fall off with exit pupil and field of view and barely meet the Modulation Transfer Function (MTF) performance required for night vision sensors.

A reduction in mass at the HMD system level is desirable for a number of reasons. To establish the effects of head supported mass during flight, the mass is multiplied by the aircraft acceleration. For high performance fighter aircraft pulling a 10 G turn, the mass of the HMD is multiplied by 10. Head supported mass also affects the induced neck loads during parachute deployment, HMD components, especially the optics, tend to be oriented forward and upward in the helmet. Neck strain during normal flight can be exacerbated by this forward center of mass, for example, induced neck forces during ejection and parachute deployment may be worsened by an upward and forward center of mass.

What is needed is an optical system having a lower mass. What is also needed is an optical system that does not need an IPD adjustment mechanism. What is also needed is an optical system having a smaller volume lens system. What is further needed is an optical system having a smaller volume display module. What is further still needed is an optical system having a lower cost. What is further still needed is an optical system without the need for a custom fit system.

SUMMARY

One exemplary embodiment of the disclosure relates to an apparatus for providing an optical display. The apparatus includes an optical substrate for propagating light received from a light source, a first set of one or more switchable diffractive elements in the substrate, and a second set of one or more switchable diffractive elements in the substrate. Each diffractive element in the second set corresponds to a diffractive element in the first set. Each of the diffractive elements in the first and second sets is configured to diffract light when switched off and allow light to pass through when switched on. Each of the first set of diffractive elements is configured to diffract the light at an angle for propagation in the substrate. Each of the second set of diffractive elements is configured to diffract the light for display.

Another exemplary embodiment of the disclosure relates to an apparatus for providing an optical display. The apparatus includes a substrate for propagating light received from a light source, a first set of one or more switchable Bragg gratings or holographic polymer dispersed liquid crystal devices in the substrate, and a second set of one or more switchable Bragg gratings or holographic polymer dispersed liquid crystal devices in the substrate. Each Bragg grating or liquid crystal device in the second set corresponds to a Bragg grating or liquid crystal device in the first set. Each of the Bragg gratings or liquid crystal devices in the first and second sets is configured to switch between on and off states, one of the states for diffracting light and the other state for allowing light to pass through. Each of the first set of Bragg gratings or liquid crystal devices is configured to diffract the light at an angle for propagation in the substrate. Each of the second set of Bragg gratings or liquid crystal devices is configured to diffract the light for display.

Another exemplary embodiment of the disclosure relates to an apparatus for providing an optical display. The apparatus includes means for propagating light received from a light source, means for diffracting light at an input or allowing light at the input to pass through based on a switching state, and means for diffracting propagated light to an output for display or allowing propagated light to pass through based on the switching state. Each means for diffracting propagated light corresponds to a means for diffracting light at an input.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a diagram showing light passing through glass and air, according to an exemplary embodiment.

FIG. 2 is a diagram showing light passing through glass and a diffraction coupling, according to an exemplary embodiment.

DETAILED DESCRIPTION

Figures 3, 4:
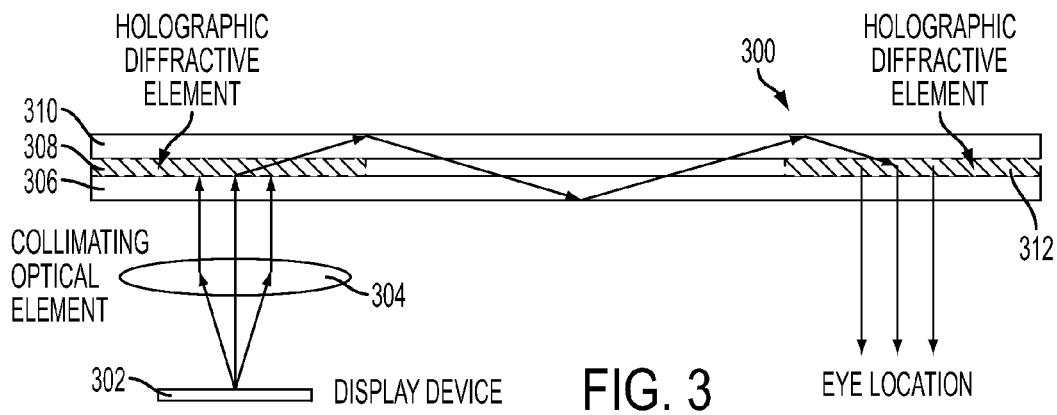
FIG. 3 is a diagram showing light from a display device propagating through a waveguide, according to an exemplary embodiment.
FIG. 4 is a chart illustrating calculated external angles for a diffractive optical element that couples light into or out of a waveguide, according to an exemplary embodiment.

Referring to FIG. 1, a light wave 100 may pass through a glass or plastic layer 102 and an air layer 104, according to an exemplary embodiment. The refractive index of glass/plastic 102 may be found using Snell's equation: Sine i/Sine r=refractive index. The largest angle of incidence in which light wave is refracted out of glass/plastic 102 is called the critical angle ($r_c$). In air, when i=90°, Sine $r_c$=1/refractive index, so for propagation in a waveguide (parallel surfaces of optical medium) the allowable angle range is $r_c$ to r=90°. Practically speaking, for substrate guided optics, the internal angle range is generally much smaller and equates to an external angle of about 20° to 30°.

Referring to FIG. 2, light enters a substrate or waveguide 200 and is diffracted by a diffraction grating 202 between a glass layer 204 and another glass layer 206. Diffraction grating 202 adjusts the angle of the light passing through glass 204 so that the angle of the light as it meets the upper surface of glass 206 is beyond the critical angle and it reflects internally in waveguide 200. The light will then pass back through grating 202 and glass layer 204 and exit into the air at a different point than it entered glass layer 204. According to various exemplary embodiments, diffraction grating 202 may be a thick phase transmission hologram, a reflection hologram, a Bragg grating, binary or uniform optics, or another surface grating or diffractive surface.

For example, co-owned U.S. Pat. No. 5,856,842, which is herein incorporated by reference in its entirety, shows how light from a far field object (where the light is substantially collimated) can be coupled into a waveguide and out again by diffractive means, for example in a periscope. The far field object can also be created by a collimating lens in the same manner that an HMD or HUD images light from a display device, for example a CRT or flat panel display (e.g., an LCD display, a plasma display, etc.). The optics of the periscope may be used to displace the light from a collimating lens and can be used in an HMD, a HUD, or eyewear, for example a combiner in a conventional HMD or HUD.

Referring to FIG. 3, a simplified holographic waveguide 300 receives light transmitted from a display device 302 and through a collimating element 304. The light passes through a glass (or optical plastic or other transparent) layer 306 and a diffractive element 308 (e.g., a holographic diffractive element), which is configured to diffract the light at a different angle. The diffracted light has an angle greater than the critical angle of a glass layer 310 and glass layer 306 and thus propagates internally to a second diffractive element 312. Element 312 is configured to diffract the light out of waveguide 300, for example to an eye location. Because the diffractive power of in-coupling diffractive surface 308 is the same as out-coupling diffractive surface 312, the input and output angles are the same. This is generally true for any wavelength and thus there may be no chromatic aberration in the system.

Light propagation may be limited within a range of angles, for example the total internal reflection (TIR) is about 41 degrees to the substrate normal for glass. This range of angles can be extended slightly using a reflective coating, but this may diminish the transparency of the substrate. Light propagation may also be limited by light parallel to the surface (90 degrees to the surface normal). Light coupled into waveguide 300 using diffractive element 308 therefore has a range of angles that relates to the power of diffractive element 308 (e.g., diffraction grating line spacing) and refraction out of element 308.

Referring to FIG. 4, these conditions have been tabulated in a chart 400 to show that the range of the external angles coupling into the waveguide or out of the waveguide may have a theoretical limit of about 30 degrees, according to an exemplary embodiment using BK-7 optical glass. Chart 400 shows an analysis of the external angles that can be employed versus the internal limits of the waveguide and how the range of external angles vary depending upon the grating spacing. Light propagates inside the waveguide (e.g., waveguide 300) between 90 degrees to the normal and the TIR angle of the substrate. In the illustrated example, the incidence angle in air at the substrate (field of view) is between −23.75 degrees and 4.39 degrees, giving a range of 28.14 degrees or less than 30 degrees.

The practical limit of the external angles is far less than 30 degrees. In another example, a limit of 20 degrees has been set for discussion purposes and as a representation of a reasonable limit for the angular bandwidth of a typical hologram. At system level, in order to expand the field of view well beyond about 20-30 degrees more than one hologram may be used. Each hologram diffracts light from a cone of external angles (e.g., about 20 degrees range) into the waveguide and propagates the light within the range of allowable angles supported by the waveguide (between 90 degrees and the TIR condition). However, the external angles of each hologram can be offset with respect to the other hologram by changing the diffractive power.

Figure 5:
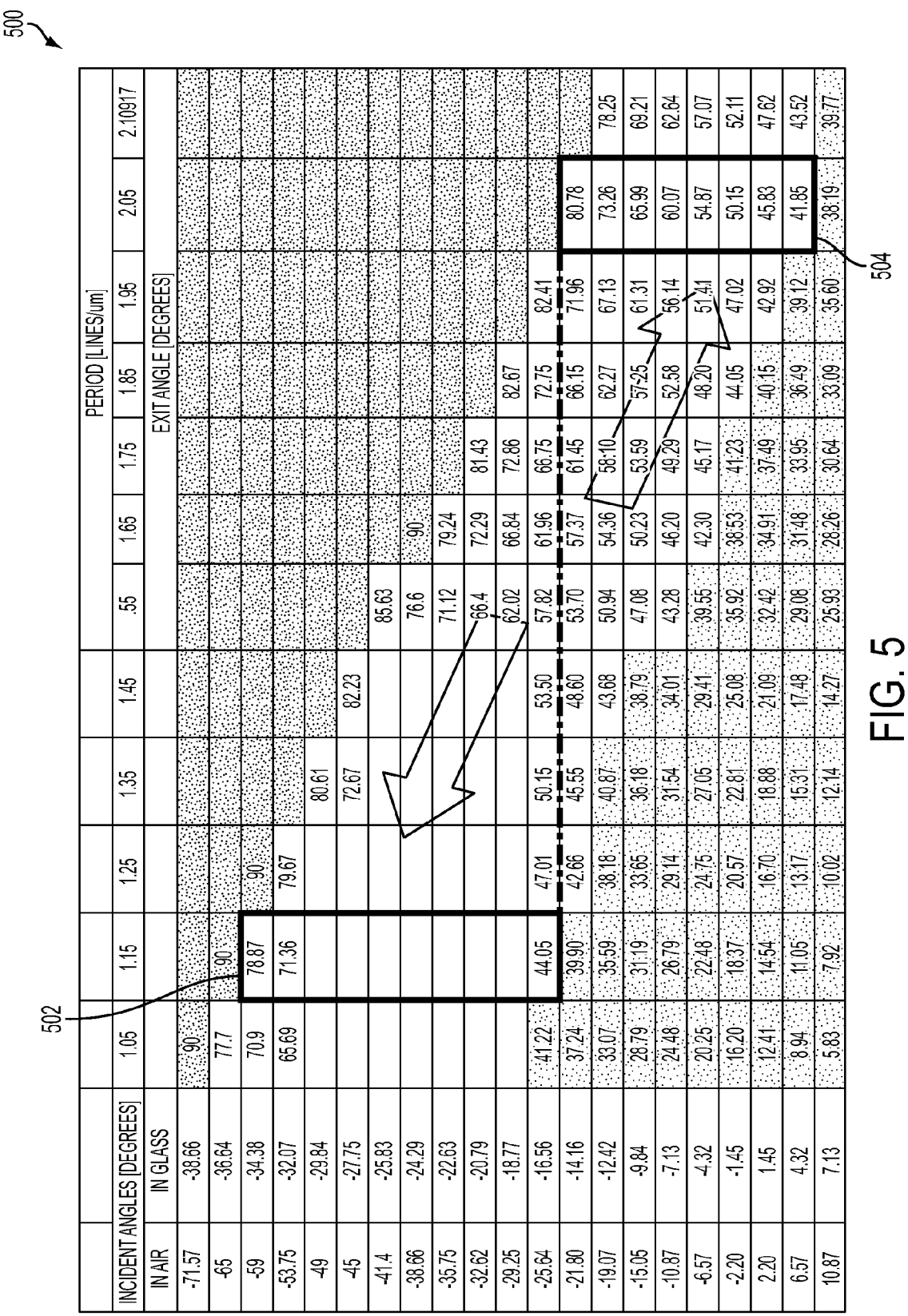
FIG. 5 is a chart illustrating calculated external angles for a diffractive optical element using two holograms to expand the field of view of a waveguide, according to an exemplary embodiment.

Referring to FIG. 5, a chart 500 illustrates that two holograms can couple light within the allowable angles of the substrate with external angles adding up to more than 30 or 40 degrees to expand the field of view of the system, according to an exemplary embodiment. If diffraction gratings 502 and 504 are applied, the field of view of the system in this example is expanded between about −59 degrees and about 6.57 degrees or to approximately 70 degrees (angle in air).

Figure 6:
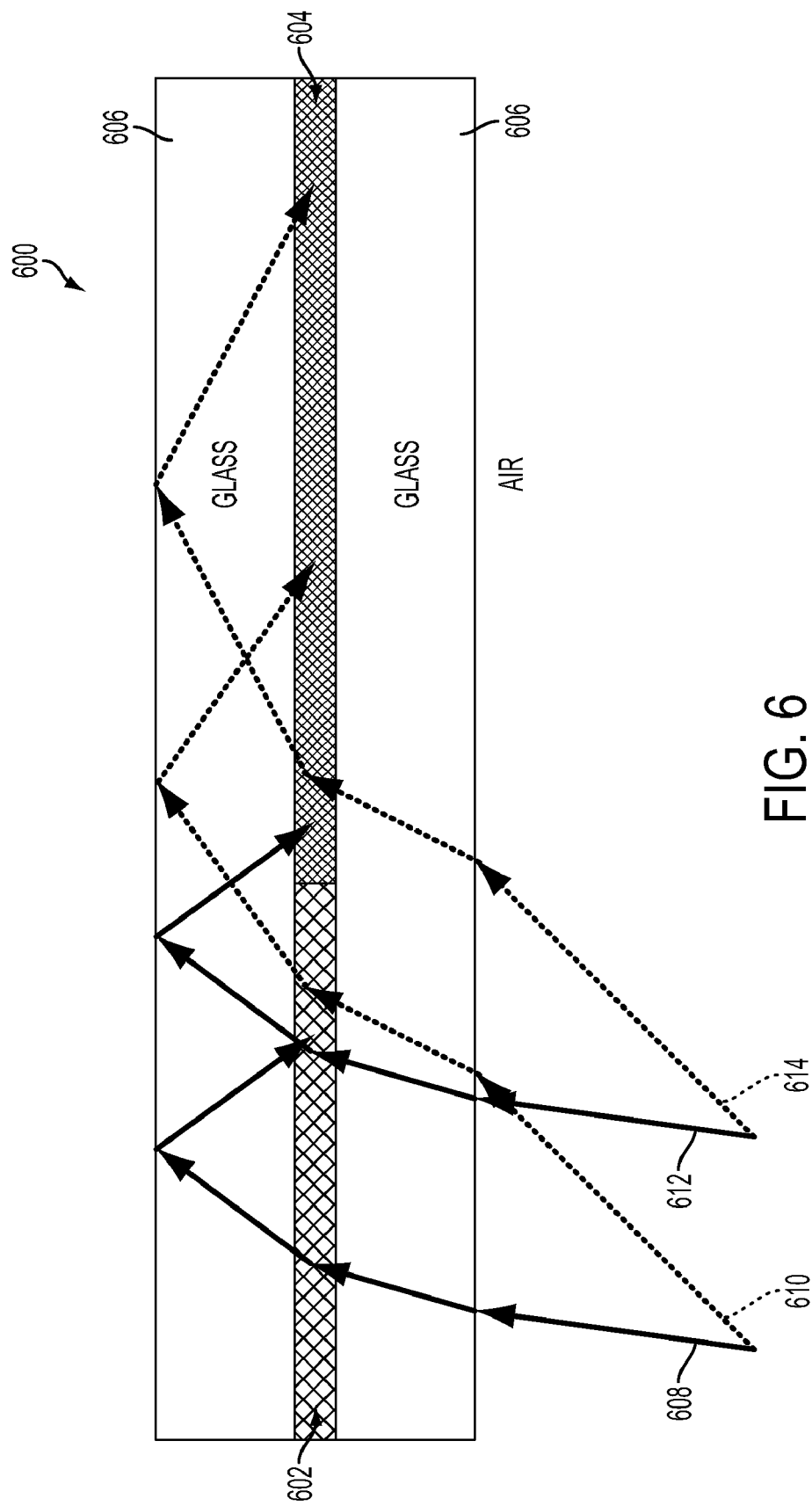
FIG. 6 is a diagram showing light propagating through a waveguide including multiple diffractive surfaces, according to an exemplary embodiment.

Referring to FIG. 6, a waveguide 600 includes two diffractive surfaces 602 and 604 in a substrate 606 to extend the field of view of the system, according to an exemplary embodiment. A light ray or wave 608 and a light ray 610 form a first field of view angle and both fall incident on diffractive surface 602. A light ray 612 and a light ray 614 form a second field of view angle and fall incident on diffractive surfaces 602 and 604 causing the behavior of the light to be different (shown here as diverging light rays). If the light from rays 612 and 614 hit out-coupling diffractive surface 604, the resultant image will be a double image. If the light is broad band (e.g. 50 nm from an LED), then the difference in diffractive power between in-coupling diffractive element 602 and out-coupling diffractive element 604 may also induce chromatic aberration.

Figure 7:
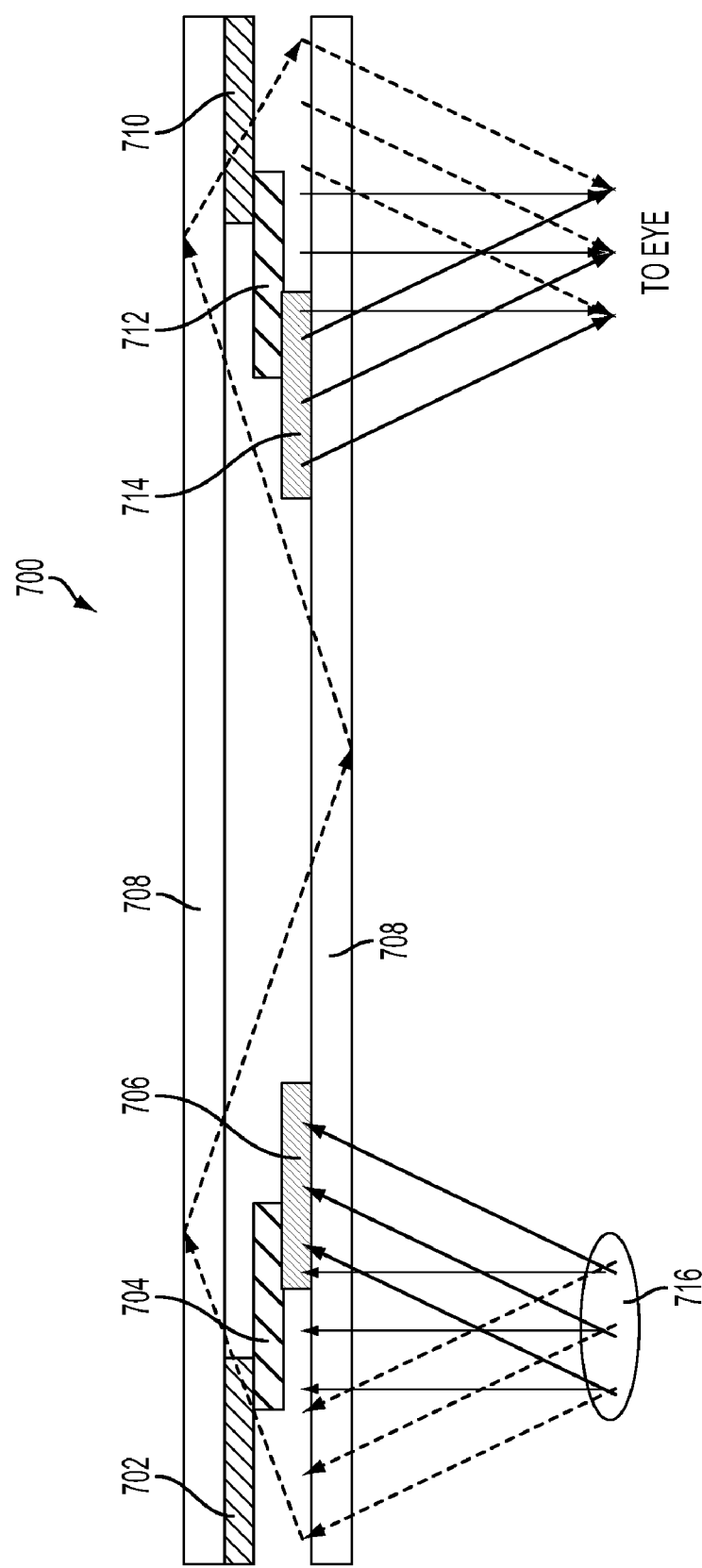
FIG. 7 is a diagram showing light propagating through a waveguide including multiple diffractive surfaces, according to another exemplary embodiment.

Referring to FIG. 7, a waveguide 700 illustrates how in-coupling switchable diffractive elements and out-coupling diffractive elements can be paired up and switched in and out (on and off or vice versa) so that the output light does not suffer from image doubling and chromatic aberration, which would be present if trying to use non-switchable diffraction elements as discussed earlier. Waveguide 700 includes diffractive elements 702, 704, and 706 (e.g., switchable diffractive elements such as electronically switchable Bragg gratings or Holographic Polymer Dispersed Liquid Crystal (HPDLC)) in substrate 708 at an input portion and diffractive elements 710, 712, and 714 in substrate 708 at an output portion. Output diffractive elements 710, 712, and 714 have the equal and opposite diffractive power as corresponding input diffractive elements 702, 704, and 706, respectively. In the illustrated exemplary embodiment, light is received by a collimating device 716 from three different angles. The input collimating lens generates a field of view that is needed for the optical display system (e.g., HMD, HUD, eyewear, etc.). According to some exemplary embodiments, the collimating lens may be integrated with diffractive elements 702, 704, 706, while in other exemplary embodiments, the collimating lens may be separate. At any point in time, only one of each input element 702, 704, or 706 may be operational or switched on along with its corresponding output element 710, 712, or 714 and all elements may switch consecutively within the frame time of the system. Light does not couple into waveguide 700 until it hits a diffractive element (702, 704, or 706) that is operational. Therefore, only light from one angle range is coupled into waveguide 700 at any one point in time. Further, light does not couple out of the substrate until it hits the diffraction element that is operational.

According to the illustrated example, a single parallel beam of light shown by dashed lines hits diffraction surface 702 and is diffracted into waveguide 700 until it hits complimentary diffractive surface 710 and is diffracted out of waveguide 700 at the same angle as it enters waveguide 700. Because the input diffractive power is equal and opposite to the output diffractive power no chromatic aberration is induced in the system. It is noted that while the FIGURE illustrates use of three input and output switchable diffractive elements, according to other exemplary embodiments, more or fewer than three switchable diffractive elements may be used. It is also noted that while the FIGURE illustrates reception and output of light at three different angles, the figure does not include the light in the range between the three field angles shown. The light incident on each of the diffractive surfaces are in a range limited by the geometric limits described herein for a single fixed diffractive surface and are therefore in a range tabulated in FIG. 4 and limited to about 30 degrees.

Figure 8A:
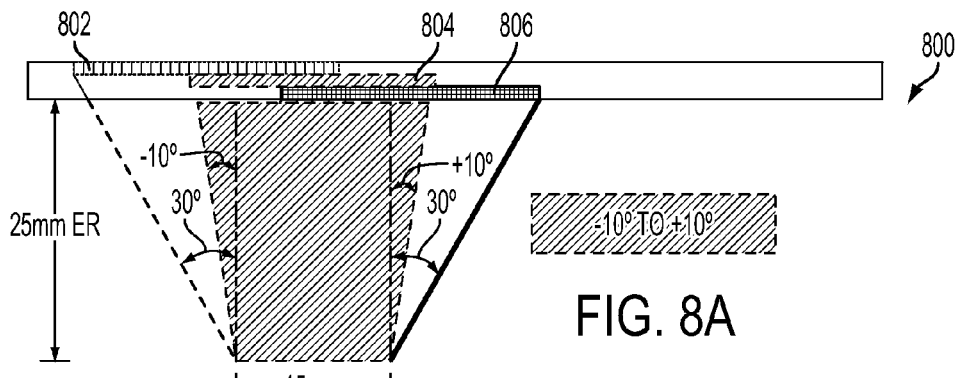
FIGS. 8A-8D are diagrams showing light exiting the waveguide of FIG. 7, according to an exemplary embodiment.
Figure 8B:
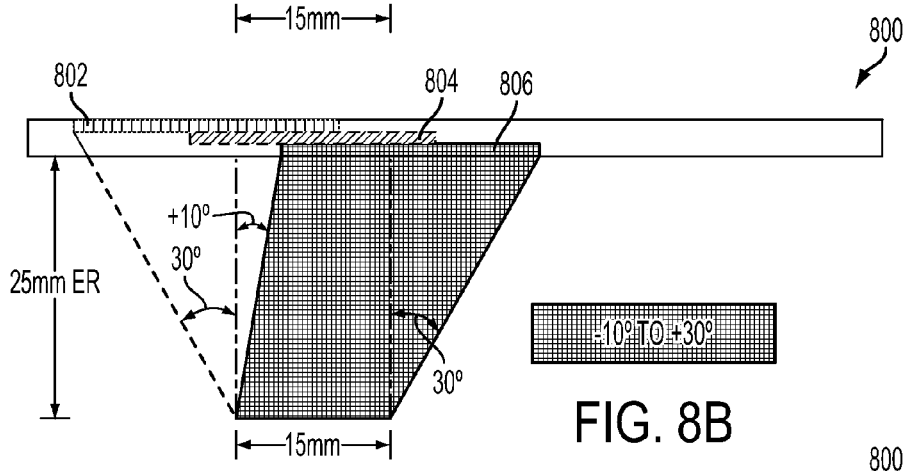
Figure 8C:
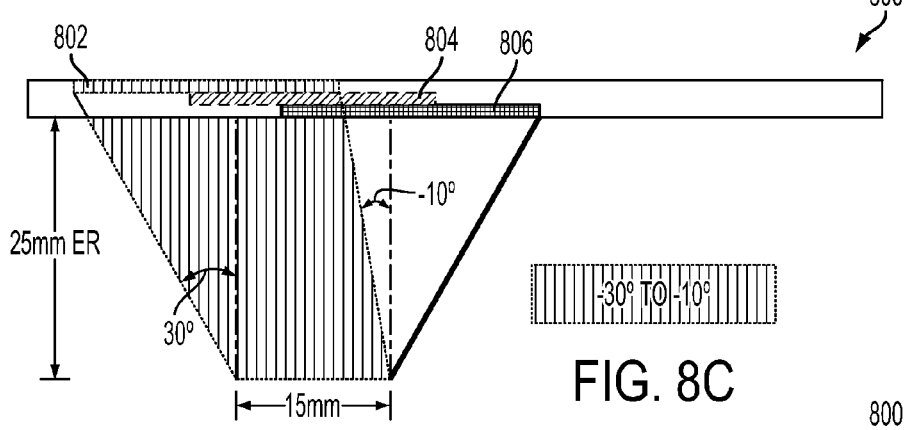
Figure 8D:
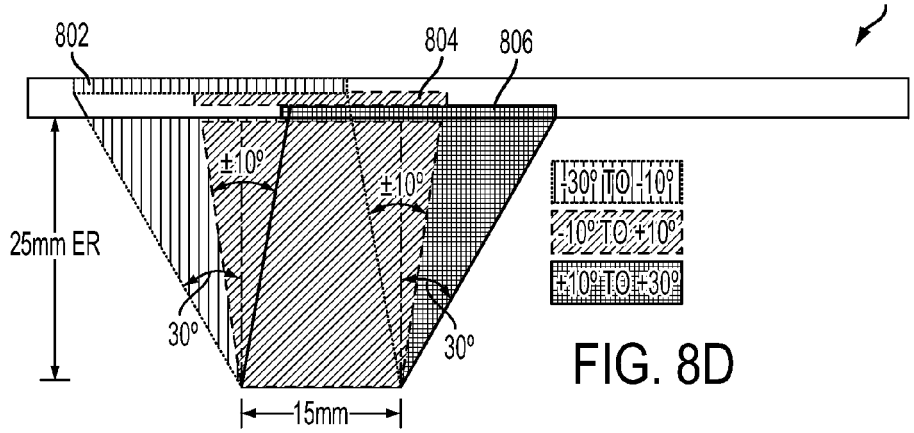

Referring to FIGS. 8A-8D, a first order geometry of output holograms for a waveguide 800 is illustrated, according to an exemplary embodiment. For purposes of this example, the exit pupil of the system was set at about 15 mm (which is generally regarded as the minimum acceptable exit pupil of an HMD or eyewear although according to other exemplary embodiments exit pupils much greater than 15 mm may be used) with an eye-relief of about 25 mm (the minimum requirement for wearing aviator spectacles). The first order geometry plots a 60 degree field of view using three holograms 802, 804, and 806, each with a field of view of about 20 degrees. FIG. 8A shows the first order geometry for the central 20 degrees (plus and minus 10 degrees from normal), FIG. 8B shows the right 20 degrees (10 to 30 degrees from the left normal), FIG. 8C shows the left 20 degrees (−10 and −30 degrees from the right normal), and FIG. 8D shows the full 60 degrees of the holographic waveguide display with three overlapping holograms. The practical implementation of using multiple switchable diffractive surfaces in an HMD, HUD, or eyewear therefore includes overlapping switchable diffractive surfaces. This includes the illustration of FIG. 7, which shows a simplified version where the diffractive surfaces are adjacent to each other.

For an extended field of view and an extended exit pupil, the footprint of the light rays for exemplary 20 degree sections overlaps at waveguide 800. The overlap may be decreased with increasing eye-relief and may be increased with increasing exit pupil size. For example, if the system has an exit pupil of 30 mm, then the overlap will be significant. Overlapping holograms cannot be employed within the same waveguide using conventional holographic material because the rays for each hologram would be indistinguishable from one another since they fall within the same range of internal waveguide angles.

According to some exemplary embodiments, multiple holograms that overlap with each other and are separated by an air space may be used, however, implementation of a mechanism for a curved visor or much greater field of view may be difficult and not lend itself to a low mass and mechanically stable solution. According to other exemplary embodiments, Switchable Bragg Gratings (SBG) (e.g., electronically switchable Bragg gratings) may be used as the diffractive element, for example as developed by SBG Labs, Inc. of Silicon Valley, Calif. According to other exemplary embodiments, switchable transmission holograms or switchable reflection holograms may be used to develop wider fields of view.

A waveguide (e.g., waveguide 700 or 800) may include multiple holograms (e.g., holograms 702, 704, and 706 or holograms 802, 804, and 806) of different powers. An SBG stack can be used that can be switched sequentially to build up the field of view of the optics This allows a setup of overlapping holograms as illustrated in FIGS. 7 and 8.

Figure 9:
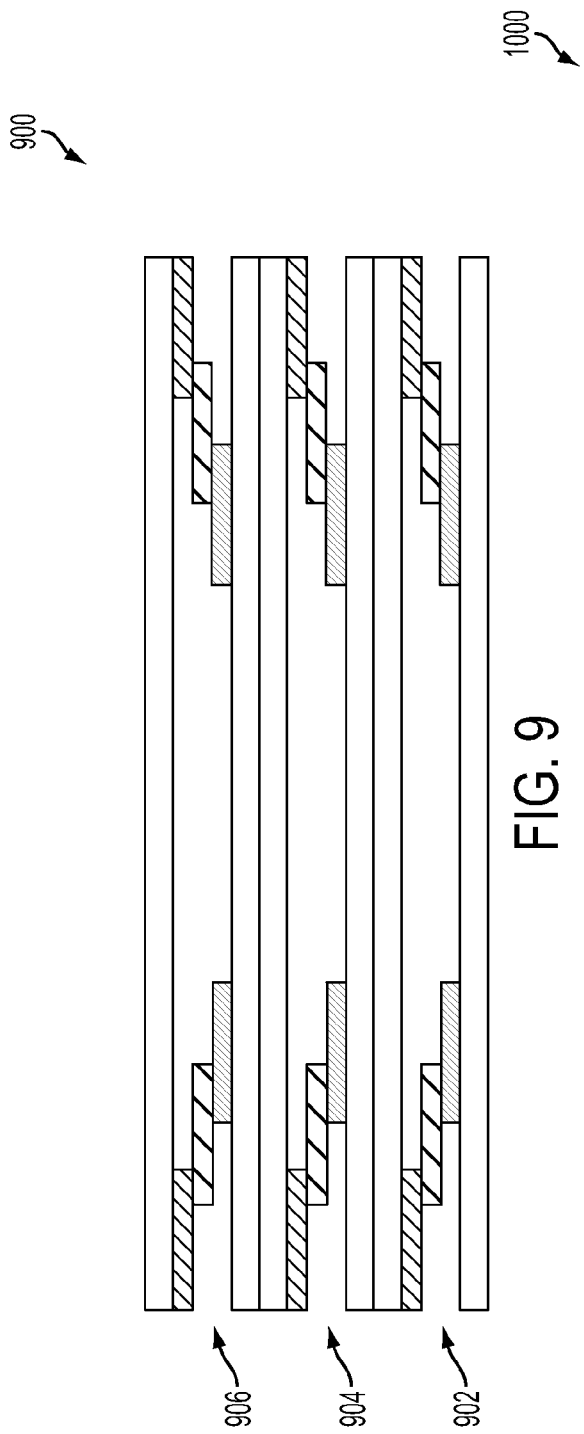
FIG. 9 is a diagram showing multiple stacked instances of the waveguide of FIG. 7, according to an exemplary embodiment.

Referring to FIG. 9, a waveguide system 900 may include multiple stacks of SBG holograms 902, 904, and 906 that are at least similar to each other, according to an exemplary embodiment. Such a system 900 may be used to generate color displays in sequential mode. Frame sequential color and frame sequential wide field of view have similar coordination between the display data, the illumination source, and the SBGs. Each SBG stacks 902, 904, and 906 may be used to propagate a different color, for example, red, blue, and green. At any given point in time, one set of input and output holograms may be switched on to diffract light of a specific color and all holograms will switch within the frame time of the system at a rate sufficient so a human eye will not perceive flicker (e.g., about 16 milliseconds). According to other exemplary embodiments, different color schemes may be used or more or fewer than three switchable diffractive stacks may be used.

Figure 10:
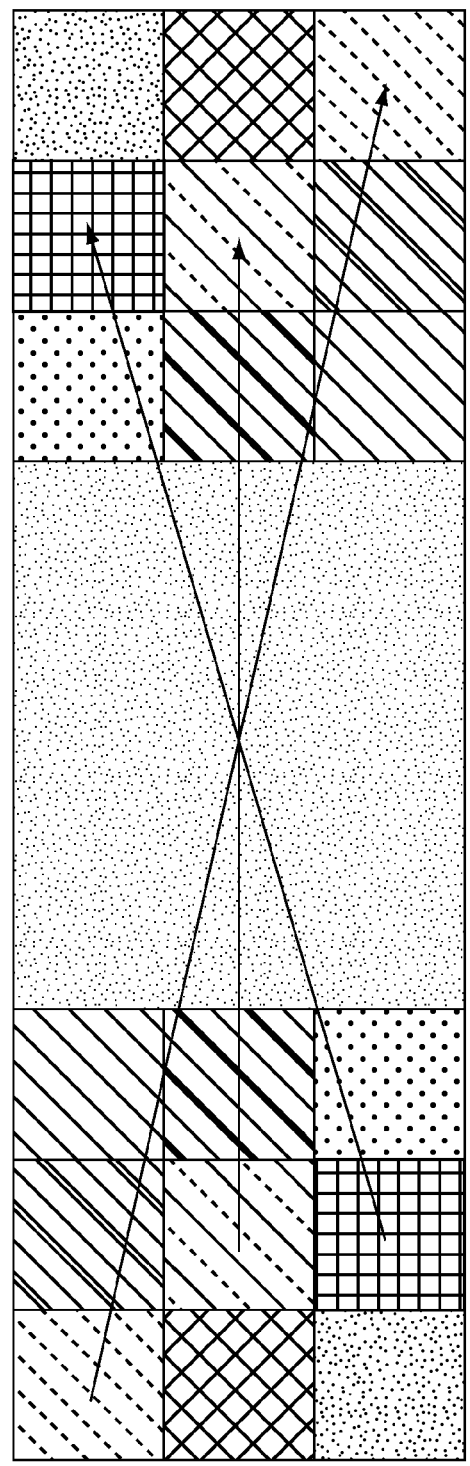
FIG. 10 is a top view of the waveguide of FIG. 7, according to an exemplary embodiment.

Referring to FIG. 10, while the waveguides have been illustrated as having single rows of diffractive elements thus far, according to other exemplary embodiments, a waveguide 10000 may include an in-coupling surface 1002 and an out-coupling diffractive surface 1004 that are paired up in a two dimensional array and have equal and opposite diffractive power. The input light may be generated using a collimating lens placed at exit pupil distance from the in-coupling diffractive array. The exit pupil of the lens may be of similar dimensions as for an HMD, HUD, or eyewear display system. The diffractive arrays concept may be used with broadband light sources and so lasers are not required in order to make the system work. It is noted that as in FIG. 8, due to the first order geometry of exit pupil and eye relief and the desire to have a contiguous field of view, overlapping switchable diffractive devices may be used in a practical implementation for an HMD, HUD, or eyewear.

According to other exemplary embodiments, the diffractive power on the input coupling diffractive elements can include additional diffractive power that can be used to color correct chromatic aberrations in the collimating lens. According to some exemplary embodiments, the waveguides described above may be used with a device that can be controlled to illuminate pixels at specific times. According to some exemplary embodiments, the waveguide system can utilize a beamsplitter in the middle of the sandwich to expand the exit pupil. Therefore, the input lens may be much smaller than for the exit pupil.

According to various exemplary embodiments, various light sources may be used to provide light waves to the waveguides described above. For example, a broad band light source such as an LED may be used with holographic waveguide displays. Chromatic dispersion induced by high power diffractive elements generally need to be negated by diffractive elements of equal and opposite power. In the case of a holographic waveguide display, this can be done by employing the same power diffractive element to couple light into and out of the waveguide. For an expanded field of view system employing switchable Bragg gratings, this same concept can be applied by using complimentary pairs of stacked SBGs for the in-coupling and out-coupling diffractive elements, as described above.

Figure 11:
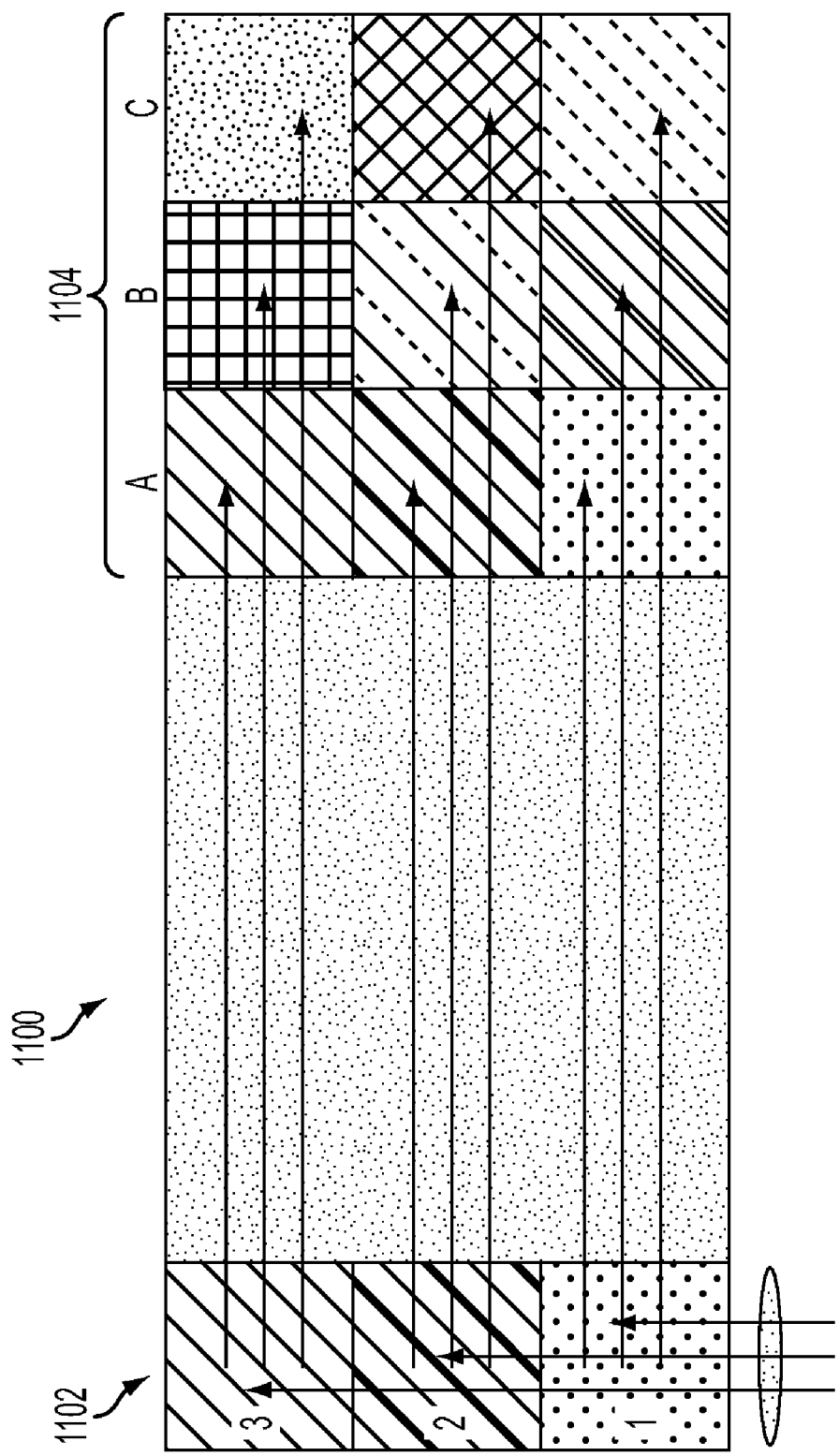
FIG. 11 is a top view of a waveguide having a laser input, according to an exemplary embodiment.

Referring to FIG. 11, compact and low cost lasers have become available (e.g. Necsel lasers available from Novalux, Inc. of San Francisco, Calif.) and represent an ideal light source for use with high diffractive power optics. Complimentary pairs of diffractive elements are not required for a holographic waveguide display 1100 employing one or more lasers, according to an exemplary embodiment. Because a laser has a very narrow spectrum, the diffractive power on an input coupling diffractive surface 1102 and an output coupling diffractive surface 1104 does not have to be balanced. Input diffractive elements 1102 are tiled 1, 2, 3 and the output diffractive elements are shown as columns A, B, C. In one example, the sequence of switching tiles may be 1 and 1A, then 1 and 1B, then 1 and 1C, then 2 and 2A, then 2 and 2B, etc. If the input device is a laser micro-mems scanner, which generally has a small field of view, the system may be able to expand this field of view sequentially using a high frame rate. The imaging device may also be a low resolution imager with a high frame rate, for example a ferro-electric crystal device.

Holographic lenses can be applied in the system that will reduce the size and mass of the final system. Lasers are highly efficient and already polarized, which enables low power HMDs, HUDs, or eyewear displays to be generated for applications such as soldier systems where battery power is a limiting factor.

Laser speckle is an issue that has hindered the introduction of laser illuminated. Easily recognizable as a sparkly or granular structure around uniformly illuminated rough surface, speckle arises from the high spatial and temporal coherence of Lasers. The resulting viewer distraction and loss of image sharpness has been an obstacle to commercialization of laser projectors. The benchmark for most applications is a speckle contrast of 1% (speckle contrast being defined as the ratio of the standard deviation of the speckle intensity to the mean speckle intensity). Mechanical methods such as rotating diffusers and vibrating screens suffer from problems of noise, mechanical complexity and size. Other passive techniques using diffractive, MEMs or holographic elements, microlens arrays and others have met with limited success. According to some exemplary embodiments, a despeckler based on an SBG that is compact, low cost, silent, easily integrated, and applicable to any type of laser display may be used, for example a despeckler developed by SBG Labs. This solution may also provide functions of beam combining, beam shaping, and homogenization integrated in a single module.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for providing an optical display, comprising:
    an optical substrate for propagating light received from a light source;
    a first set of one or more switchable diffractive elements in the substrate; and
    a second set of one or more switchable diffractive elements in the substrate, each diffractive element in the second set corresponding to a diffractive element in the first set, each of the diffractive elements in the first and second sets configured to switch between on and off states, one of the states for diffracting light and the other state for allowing light to pass through, each of the first set of diffractive elements configured to diffract the light at an angle for propagation in the substrate, and each of the second set of diffractive elements configured to diffract the light for display.

2. The apparatus of claim 1, wherein the switchable diffractive elements of the first and second sets are electronically switchable diffraction gratings comprising one or more of switchable Bragg gratings and holographic polymer dispersed liquid crystal.

3. The apparatus of claim 1, wherein the diffractive power of each diffractive element in the first set is the same as the diffractive power of each diffractive element in the second set.

4. The apparatus of claim 1, wherein each of the diffractive elements in the first set at least partially overlap and each of the diffractive elements in the second set at least partially overlap.

5. The apparatus of claim 1, further comprising a collimating device for providing light from the light source to the substrate.

6. The apparatus of claim 5, wherein the collimating device comprises a diffractive lens integrated with the in-coupling switchable diffractive device.

7. The apparatus of claim 1, wherein the light from the light source comprises light waves from varying angles, each of the diffractive elements in the first and second sets configured to diffract light from a specific set of angles.

8. The apparatus of claim 1, wherein the field of view provided for display is greater than 30 degrees.

9. The apparatus of claim 1, wherein the diffractive elements of the first and second sets all switch within a display frame time sufficiently short so that a human eye does not perceive display flicker.

10. The apparatus of claim 1, wherein the substrate comprises a transparent dielectric.

11. The apparatus of claim 1, wherein the switchable diffractive elements are tuned to different wavelengths of light for generating color by sequentially switching the diffractive elements for three or more colors.

12. The apparatus of claim 1, wherein the switchable diffractive elements are used in transmission or reflection mode.

13. The apparatus of claim 1, wherein the apparatus is mounted in a head mourned display, a heads-up display, or eyewear.

14. The apparatus of claim 1, wherein each of the Bragg gratings or liquid crystal devices in the first set at least partially overlap and each of the Bragg gratings or liquid crystal devices in the second set at least partially overlap.

15. The apparatus of claim 1, wherein the light from the light source comprises light waves from varying angles, each of the Bragg gratings or liquid crystal devices in the first and second sets configured to diffract light from a specific set of angles and wherein the field of view provided for display is greater than 30 degrees.

16. The apparatus of claim 1, wherein the Bragg gratings or liquid crystal devices of the first and second sets all switch within a display frame time sufficiently short so that a human eye does not perceive display flicker.

17. The apparatus of claim 1, wherein the apparatus is mounted in a head mounted display, a heads-up display, or eyewear.

18. An apparatus for providing an optical display, comprising:
a substrate for propagating light received from a light source;
a first set of one or more switchable Bragg gratings or holographic polymer dispersed liquid crystal devices in the substrate; and
a second set of one or more switchable Bragg gratings or holographic polymer dispersed liquid crystal devices in the substrate, each Bragg grating or liquid crystal device in the second set corresponding to a Bragg grating or liquid crystal device in the first set, each of the Bragg gratings or liquid crystal devices in the first and second sets configured to switch between on and off states, one of the states for diffracting light and the other state for allowing light to pass through, each of the first set of Bragg gratings or liquid crystal devices configured to diffract the light at an angle for propagation in the substrate, and each of the second set of Bragg gratings or liquid crystal devices configured to diffract the light for display.

19. The apparatus of claim 18, wherein the diffractive power of each Bragg grating or liquid crystal device in the first set is the same as the diffractive power of each Bragg grating or liquid crystal device in the second set.

* * * * *

UNITED STATES PATENT AND TRADEMARK OFFICE
Certificate

Patent No. 8,233,204 B1                                      Patented: July 31, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven J. Robbins, San Jose, CA (US); James H. Stanley, Palo Alto, CA (US); Francois Raynal, San Jose, CA (US); Robert D. Brown, Lake Oswego, RI, (US); James M. Tedesco, Livonia, MI (US); Wyatt L.. Hendrick, San Diego, CA (US); Milan M. Popovich, Leicester (GB); Jonathan D. Waldern, Los Altos Hills, CA (US); and Alastair J. Grant, San Jose, CA (US).

Signed and Sealed this Thirtieth Day of September 2014.

THOMAS K. PHAM
*Supervisory Patent Examiner*
Art Unit 2872
Technology Center 2800